(12) United States Patent
Moni

(10) Patent No.: US 7,543,326 B2
(45) Date of Patent: Jun. 2, 2009

(54) DYNAMIC RATE CONTROL

(75) Inventor: Shankar Moni, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 1320 days.

(21) Appl. No.: 10/170,052

(22) Filed: Jun. 10, 2002

(65) Prior Publication Data

US 2003/0229902 A1   Dec. 11, 2003

(51) Int. Cl.
*H04N 7/173* (2006.01)
*H04L 12/26* (2006.01)
*H04J 3/16* (2006.01)

(52) U.S. Cl. .................. 725/95; 370/230; 370/235; 370/252; 370/253; 370/468; 725/96

(58) Field of Classification Search ............. 370/230, 370/235, 252, 253, 468; 725/95, 96
See application file for complete search history.

(56) References Cited

U.S. PATENT DOCUMENTS

| | | | |
|---|---|---|---|
| 5,142,592 A | 8/1992 | Moler | |
| 5,446,804 A | 8/1995 | Allebach et al. | |
| 5,512,956 A | 4/1996 | Yan | |
| 5,548,662 A | 8/1996 | Kwon | |
| 5,661,824 A | 8/1997 | Allebach et al. | |
| 5,668,598 A | 9/1997 | Linzer et al. | |
| 5,684,894 A | 11/1997 | Shustorovich | |
| 5,796,875 A | 8/1998 | Read | |
| 5,802,213 A | 9/1998 | Gardos | |
| 5,805,221 A | 9/1998 | Lee | |
| 5,850,294 A | 12/1998 | Apostolopoulos et al. | |
| 5,852,475 A | 12/1998 | Gupta et al. | |
| 5,903,673 A | 5/1999 | Wang et al. | |
| 5,920,356 A | 7/1999 | Gupta et al. | |
| 5,995,080 A | 11/1999 | Biro et al. | |

(Continued)

FOREIGN PATENT DOCUMENTS

EP   0381067 A2   8/1990

OTHER PUBLICATIONS

Al-Fahoum, Amjed S., "Combined Edge Crispness and Statistical Differencing for Deblocking JPEG Compressed Images", IEEE Transactions of Image Processing, vol. 10, No. 9, Sep. 2001, pp. 1288-1298.

(Continued)

*Primary Examiner*—Chris Kelley
*Assistant Examiner*—Franklin S Andramuno
(74) *Attorney, Agent, or Firm*—Lee & Hayes, PLLC

(57) ABSTRACT

Dynamic rate control can be implemented in a television-based entertainment environment when forwarding coded data. Real-time information flows are encoded, transcoded, compressed, etc. into data streams that may be forwarded to other components within an apparatus or to other apparatuses across a network. In a described implementation, a bitcount accumulation of a data stream is monitored in multiple overlapping windows. The data stream is compared to a data limit in each window of the multiple overlapping windows to determine whether an expected bitcount accumulation has been exceeded. The data stream is modified responsive to the comparison(s). For example, if the bitcount accumulations in each window exceed the expected bit accumulations at the corresponding relative positions of each window, then the bit rate of the data stream can be modified by reducing bit rate consumption.

48 Claims, 10 Drawing Sheets

U.S. PATENT DOCUMENTS

| | | | |
|---|---|---|---|
| 6,014,693 A * | 1/2000 | Ito et al. ............... 709/219 |
| 6,040,861 A | 3/2000 | Boroczky et al. |
| 6,104,434 A | 8/2000 | Nakagawa et al. |
| 6,178,205 B1 | 1/2001 | Cheung et al. |
| 6,181,742 B1 | 1/2001 | Rajagopalan et al. |
| 6,278,735 B1 | 8/2001 | Mohsenian |
| 6,281,942 B1 | 8/2001 | Wang |
| 6,285,801 B1 | 9/2001 | Mancuso et al. |
| 6,320,905 B1 | 11/2001 | Konstantinides |
| 6,373,482 B1 | 4/2002 | Migdel et al. |
| 6,449,255 B1 * | 9/2002 | Waclawsky ............ 370/236 |
| 6,504,873 B1 | 1/2003 | Vehvilainen |
| 6,539,060 B1 | 3/2003 | Lee et al. |
| 6,611,503 B1 * | 8/2003 | Fitzgerald et al. ........ 370/260 |
| 6,665,346 B1 | 12/2003 | Lee et al. |
| 6,668,095 B2 | 12/2003 | Rackett |
| 6,690,838 B2 | 2/2004 | Zhou |
| 6,728,414 B1 | 4/2004 | Chang et al. |
| 6,816,166 B2 | 11/2004 | Shimizu et al. |
| 6,898,321 B1 | 5/2005 | Knee et al. |
| 6,950,473 B2 | 9/2005 | Kim et al. |
| 6,963,613 B2 | 11/2005 | MacInnis et al. |
| 6,983,079 B2 | 1/2006 | Kim |
| 6,996,285 B2 | 2/2006 | Unruh et al. |
| 7,003,174 B2 | 2/2006 | Kryukov et al. |
| 7,031,392 B2 | 4/2006 | Kim et al. |
| 7,120,197 B2 | 10/2006 | Lin et al. |
| 7,227,901 B2 | 5/2007 | Joch et al. |
| 2001/0019634 A1 | 9/2001 | Lainema et al. |
| 2002/0159096 A1 | 10/2002 | Sun et al. |
| 2003/0035586 A1 | 2/2003 | Chou et al. |
| 2003/0058944 A1 | 3/2003 | MacInnis et al. |

OTHER PUBLICATIONS

Chou, Jim et al., "A Simple Algorithm For Removing Blocking Artifacts in Block-Transform Coded Images", University of Illinois at Urbana-Champaign, Dept. of Electrical and Computer Engineering; Sep. 27, 1997, 10 pages.

Chou, Jim, "A Simple Algorithm for Removing Blocking Artifacts in Block-Transform Coded Images", IEEE Signal Processing Letters, vol. 5, No. 2, Feb. 1998, pp. 33-35.

Sung, Duek Kim, et al., "A Deblocking Filter with Two Separate Modes in Bock-Based Video Coding", IEEE Transactions on Circuits and Systems for Video Technology, vol. 9, No. 1, Feb. 1999, pp. 156-160.

Wang, Qiu-Hong, "Reduction of Blocking Artifacts in Real Time Video Compression", Mini-Micro System, vol. 22, No. 6, Jun. 2001, 5 pages, Including English-language Abstract.

* cited by examiner

DYNAMIC RATE CONTROL

TECHNICAL FIELD

This disclosure relates in general to real-time rate control and in particular, by way of example but not limitation, to implementing dynamic rate control under finite bandwidth constraints in real-time.

BACKGROUND

Television-based entertainment systems are expanding the programming and services that they offer. In addition to television program content such as that found on broadcast and traditional cable networks, television service providers are adding interactive services, features, and applications. Such content and additional information are downloaded over a television-based network for display, use, and/or storage on client-side set-top boxes or similar devices. These downloads include audio and/or video information that are transmitted in real-time. To reduce the amount of data that is streamed, the information is typically compressed from a first size to a second smaller size. Because the streaming occurs in real-time, the information flow is compressed on-the-fly without knowing the ultimate data rate level and/or amount of data that will be produced and therefore streamed.

Regardless of whether the information to be transmitted is intended to be sent over a network or stored in a memory (or both), there is a finite amount of bandwidth available for the compressed data. For example, a given network has a maximum transmission capacity at which it is designed to operate, often on both an individual user level and on a total composite level. Audio and video information may be compressed by encoding it using any of many available approaches and standards, such as a Moving Pictures Expert Group(MPEG)-based standard. The encoding reduces the bandwidth needed to transmit or store the resulting data. However, the degree to which encoding compresses information varies depending on the information itself. For example, some information compresses to one-fourth of its previous size while other information compresses to only one-half of its previous size, even using the same encoding parameters.

A transmission or storage medium's bandwidth limit(s) provide a guide as to what encoding parameters should be selected for compressing audio and video information to achieve a desired data rate that meets the medium's bandwidth limits. Unfortunately, because the same encoding parameters compress different information to differing degrees, it can be difficult if not impossible to accurately predict the ultimate bandwidth limits that will be met using a given set of encoding parameters on a real-time information flow.

In fact, there are two primary options for selecting encoding parameters in concert with adhering to bandwidth limits of a given transmission or storage medium. First, aggressive encoding parameters may be selected to significantly reduce the size of the resulting compressed data stream to ensure that any bandwidth limits are satisfied, but presentation quality suffers when the overly-compressed data is decompressed and the original audio and video information is presented. Second, conservative encoding parameters may be selected so that both compression and consequential quality reductions are minimized, but then data may be dropped or otherwise lost if medium bandwidth limits are exceeded. For example, if the memory storage bandwidth limit is exceeded prior to completion of a real-time data streaming event, then any un-stored data is lost.

Accordingly, for television-based entertainment systems, there is a need for schemes and techniques to enable the real-time compression of audio and video information that will meet bandwidth constraints while not unduly reducing the resulting presentation quality of the audio and video information after decompression.

SUMMARY

Dynamic rate control can be implemented in a television-based entertainment environment when encoding, transcoding, or compressing data. Real-time information flows are encoded, transcoded, compressed, etc. into data streams that may be forwarded to other components within an apparatus or to other apparatuses across a network. In a described implementation, a bitcount accumulation of a data stream is monitored in multiple overlapping windows. The data stream is compared to a data limit in each window of the multiple overlapping windows to determine whether an expected bitcount accumulation has been exceeded. The data stream is modified responsive to the comparison(s). For example, if the bitcount accumulations in each window exceed the expected bit accumulations at the corresponding relative positions of each window, then the bit rate of the data stream can be modified by reducing bit rate consumption.

BRIEF DESCRIPTION OF THE DRAWINGS

The same numbers are used throughout the drawings to reference like and/or corresponding aspects, features, and components.

DETAILED DESCRIPTION

The following discussion is directed to television-based entertainment systems, such as interactive TV networks, cable/satellite networks, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes.

However, dynamic rate control as described herein may additionally be used in other environments such as streaming (e.g., over the Internet); real-time compression and decompression; general encoding, decoding, and transcoding; and so forth. While aspects of the described systems and methods can be used in any of these environments and for any types of client devices, they are described primarily in the context of the following exemplary environment.

Exemplary System Architecture

Figure 1:
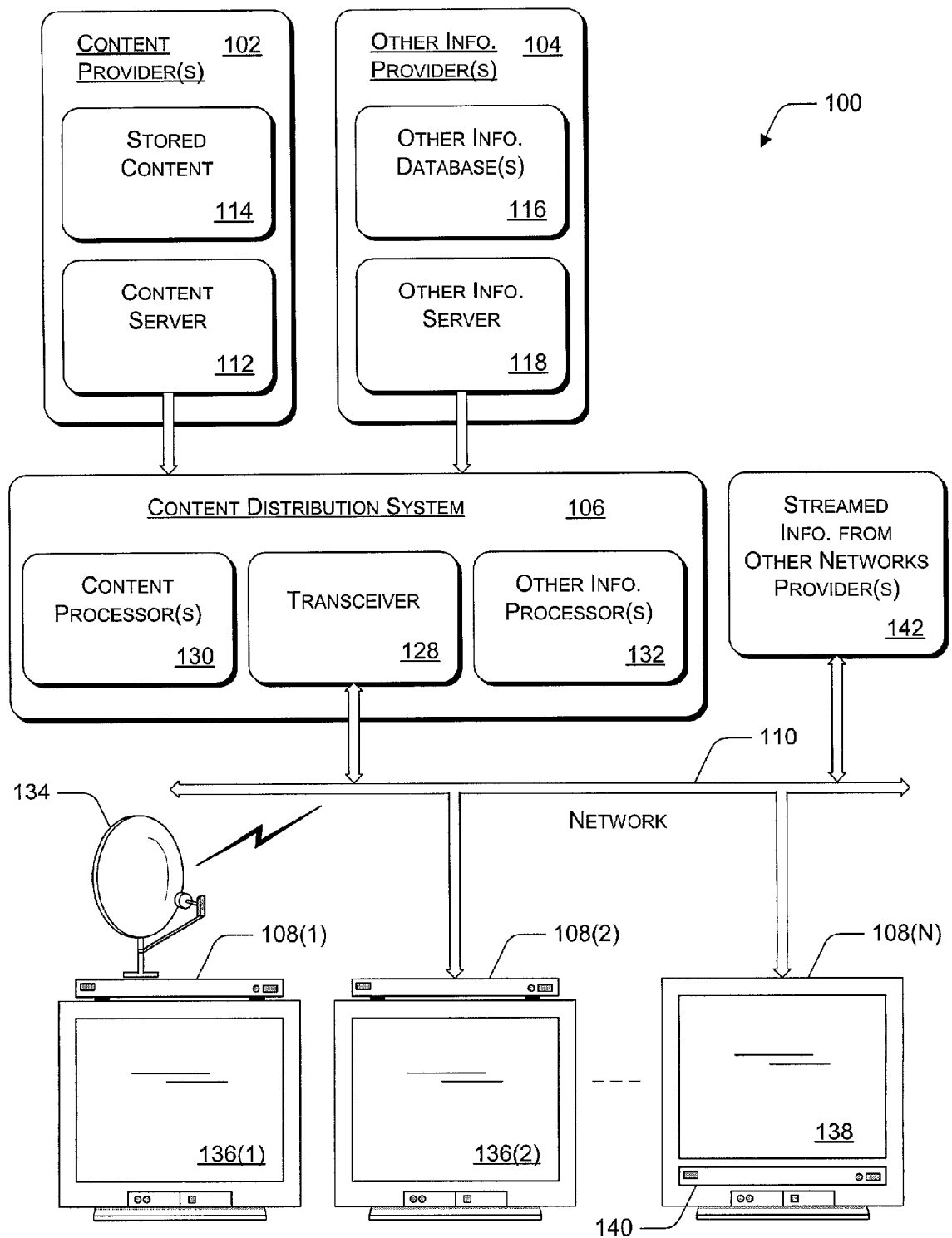
FIG. 1 illustrates an exemplary television system architecture in which the systems and methods for dynamic rate control can be implemented.

FIG. 1 illustrates an exemplary television entertainment system 100 that is an architecture in which dynamic rate control may be implemented. System 100 facilitates distribution of content and other information to multiple viewers. System 100 includes one or more content providers 102, zero, one or more other information providers 104, a content distribution system 106, and one or more data-consuming (client) devices 108(1), 108(2), . . . , 108(N) coupled to content distribution system 106 via a network 110.

Content provider 102 includes a content server 112 and stored content 114, such as movies, television programs, commercials, music, and similar audio and/or video content. Content server 112 controls distribution of stored content 114 from content provider 102 to content distribution system 106. Additionally, content server 112 may control distribution of live content (e.g., content that was not previously stored, such as live feeds) and/or content stored at other locations to content distribution system 106. Content server 112 may engage in dynamic rate control during the distribution of content from stored content 114, live content, and/or other content.

Other information provider 104 includes other information database 116 and other information server 118. Other information database 116 stores information that may be provided to client devices 108. Such information includes software modules, files, images, text, executable programs, gaming or other interactive information, and so forth. The information may also include content, especially content of an irregular, one-of-a-kind, or similar nature, or content from smaller independent providers. Part or all of the information from other information database 116 may be better enjoyed or utilized when provided to client devices 108 in real-time, such as streamed audio and/or visual information, interactive games, and so forth. Other information server 118 processes the other information from other information database 116 prior to distribution to generate one or more files that are optimized for, or at least capable of, transmission to content distribution system 106. This processing may include dynamic rate control.

Content distribution system 106 includes a transceiver 128, one or more content processors 130, and one or more other information processors 132. Transceiver 128 can alternatively be a broadcast transmitter if bidirectional communication is not required. Transceiver 128 transmits (e.g., broadcasts) signals, such as cable/satellite television signals, across network 110. Network 110 can include a cable television network, RF, microwave, satellite, and/or data network, such as the Internet, and may also include wired or wireless media using any transmission format or protocol. Additionally, network 110 can be any type of network (including a broadcast network), using any type of network topology and any network communication protocol, and can be represented or otherwise implemented as a combination of two or more networks.

Content processor 130 processes the content received from content provider 102 prior to transmitting the content across network 110. Similarly, other information processor 132 processes the other information that is received from other information provider 104 prior to transmission of the other information across network 110. A particular content processor 130 may encode, or otherwise process, the received content into a format that is understood by the multiple client devices 108(1), 108(2), . . . , 108(N) that are coupled to network 110. Content processor 130 and/or other information processor 132 may engage in dynamic rate control when distributing content and other information, respectively, to the client devices 108. Although FIG. 1 shows a single content provider 102, a single other information provider 104, and a single content distribution system 106, the exemplary system 100 can include any number of content providers and/or other information providers coupled to any number of content distribution systems. Thus, content distribution system 106, content provider 102, and/or other information provider 104 are individually or jointly representative of a headend service that provides content and other information to multiple subscribers.

Client devices 108 can be implemented in a number of ways. For example, a client device 108(1) receives content and other information from a satellite-based transmitter via a satellite dish 134. Client device 108(1) is also referred to as a set-top box or a satellite receiving device. Client device 108(1) is coupled to a television 136(1) for presenting the content and other information (e.g., audio information, video information, and/or data information) that are received by the client device 108(1), as well as for presenting a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive content and other information from network 110 and to provide the received content and other information to associated television 136(2). Client device 108(N) is an example of a combination television 138 and integrated set-top box 140. In this example, the various components and functionality of the set-top box are incorporated into the television, rather than using two separate devices. Set-top box 140 that is integrated into television 138 can receive signals (e.g., broadcast signals) via a satellite dish (similar to satellite dish 134) and/or directly via network 110. In alternate implementations, client devices 108 may receive signals via the Internet or any other network, especially those network mediums that are broadcast-capable. As is further described below, client devices 108 may also engage in dynamic rate control when forwarding information (whether content information or other information) to memory storage, other client devices, and so forth.

The exemplary system 100 also includes streamed information from other networks provider 142, which may provide information such as information streamed over the Internet, information streamed directly from a provider of the information, and so forth. Streamed information from other networks provider 142 may be accessible over network 110 (i.e., a network that also provides content information and other information from content distribution system 106). Alternatively, streamed information from other networks provider 142 may be accessible over a different network, including a wide area network (WAN), the Internet, a public or private telecommunications network, and so forth.

Dynamic Rate Control of a Data Stream

Figure 2:
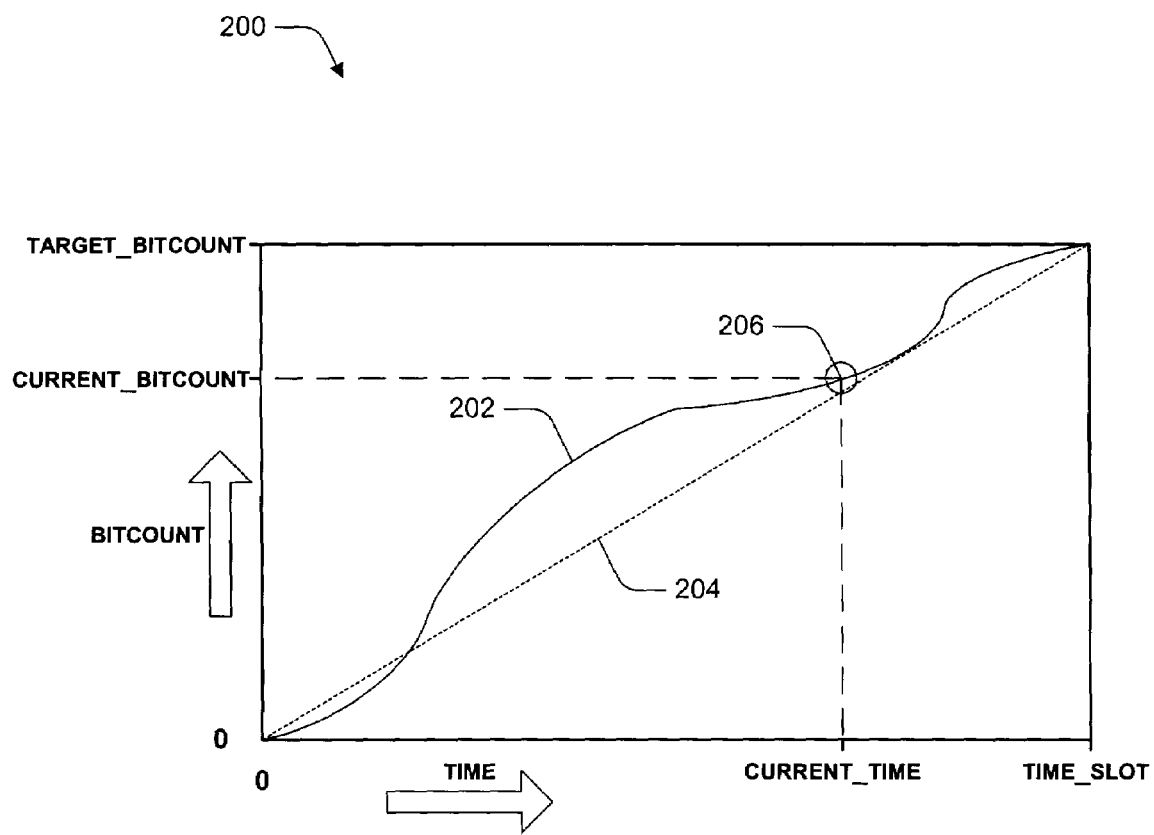
FIG. 2 is a graph that illustrates an exemplary data stream on which dynamic rate control may be implemented.

FIG. 2 is a graph 200 that illustrates an exemplary data stream 202 on which dynamic rate control may be implemented. Data stream 202 is a compressed version of an information flow such as content information from stored content 114 (of FIG. 1), other information from other information database 116, or streamed information from streamed information from other networks provider 142. When information is to be forwarded from one location or component to another location or component, it may be advantageous to compress the information into data that consumes less bandwidth than the original information. The compression can be effectuated using any of many available or customized techniques. Many such techniques comport with one or more standards promulgated by the Moving Picture Experts Group (MPEG), but other techniques may also be used.

An entire information unit such as a movie or video clip may be compressed and then forwarded. On the other hand, only part of the entire information unit may be compressed before forwarding commences. When the forwarding begins prior to compression of the entire information unit, the information flow may be considered as being streamed in real-time. As a result, the ultimate data size or data rate of the entire information unit is unknown when the forwarding commences and as the forwarding is occurring. This presents no problem if the bandwidth that maybe consumed for forwarding is unlimited. However, bandwidth is typically finite. Consequently, in such situations accommodations may be made to limit the bandwidth consumed when forwarding the compressed information flow as a data stream.

The bandwidth may be limited to comply with a maximum transmission rate, a total available memory storage, and so forth. Because the total bandwidth for the entire information unit cannot be limited as the data is being streamed, individual portion or portions may be limited to ensure that the total data rate or data size does not exceed the total available or assigned bandwidth. In other words, the data transmitted during a predetermined unit of time may be limited.

Graph 200 plots time along the abscissa axis from zero (0) to a predetermined unit of time that is denoted as "time-slot". Graph 200 plots bitcount along the ordinate axis from zero (0) to a predetermined total accumulation of bits denoted as "target_bitcount". An information flow that is to be forwarded in real-time is compressed into data stream 202. Limits, which may be soft and/or flexible limits, are placed on data stream 202 according to the target_bitcount. In other words, in every elapsed time unit that is approximately equal to the time_slot, data stream 202 is expected to have forwarded/accumulated/consumed a bitcount that is approximately equal to the target_bitcount. A dashed line 204 extends diagonally from a first point (0,0) to a second point (time_slot, target_bitcount). This dashed line 204 represents an approximate expected bitcount of data stream 202 at any particular point in time. Noted on graph 200 are (i) a particular point 206 along data stream 202 and (ii) a current_time and a current_bitcount that correspond thereto.

As can be seen from graph 200, data stream 202 is initially below dashed line 204. During this time, data stream 202 is not consuming as much bandwidth as has been allotted. While there is no need to change the compression level during this initial period with respect to ensuring that data stream 202 does not exceed the target_bitcount limit by the end of the time_slot, it may be beneficial to reduce the compression level in order to reduce information loss from the compression. Reducing the compression level usually improves the resulting presentation quality of the information after decompression. When data stream 202 is above dashed line 204, data stream 202 has/is consuming more than the allotted number of bits as of that time/position in the time_slot. In order to ensure that all of the information that is allotted to be forwarded during the given time_slot has some available bandwidth, even as the time nears the end of the time_slot, the compression level is increased so as to reduce the bit consumption of the resulting bit stream 202.

In order to keep the presentation quality after decompression relatively constant, data stream 202 is kept relatively near dashed line 204. This effectively reduces the likelihood that very few (or no) bits are left as data stream 202 approaches the end of the time_slot. In other words, situations where data stream 202 reaches a bitcount accumulation of target bitcount well before the end of the time_slot should generally be avoided. U.S. Nonprovisional Patent Application Ser. No. 09/880,243 entitled "Non-Compensated Transcoding of a Video Stream", includes description directed to avoiding these situations. U.S. Nonprovisional Patent Application Ser. No. 09/880,243, having a filing date of Jun. 13, 2001, is hereby incorporated by reference in its entirety herein. Monitoring and adjusting data stream 202 during any given time_slot may enable all of the information allotted to that given time_slot to be forwarded at a relatively constant quality level. Unfortunately, especially given that different segments (e.g., time_slots or windows) of a single information unit may be compressed to differing degrees, there may be human-perceptible presentation quality fluctuations between time_slots. Data stream 202 may, however, be monitored and consequently adjusted over multiple overlapping time_slots or windows, while still streaming the original information flow in real-time, as is described herein.

Figure 3:
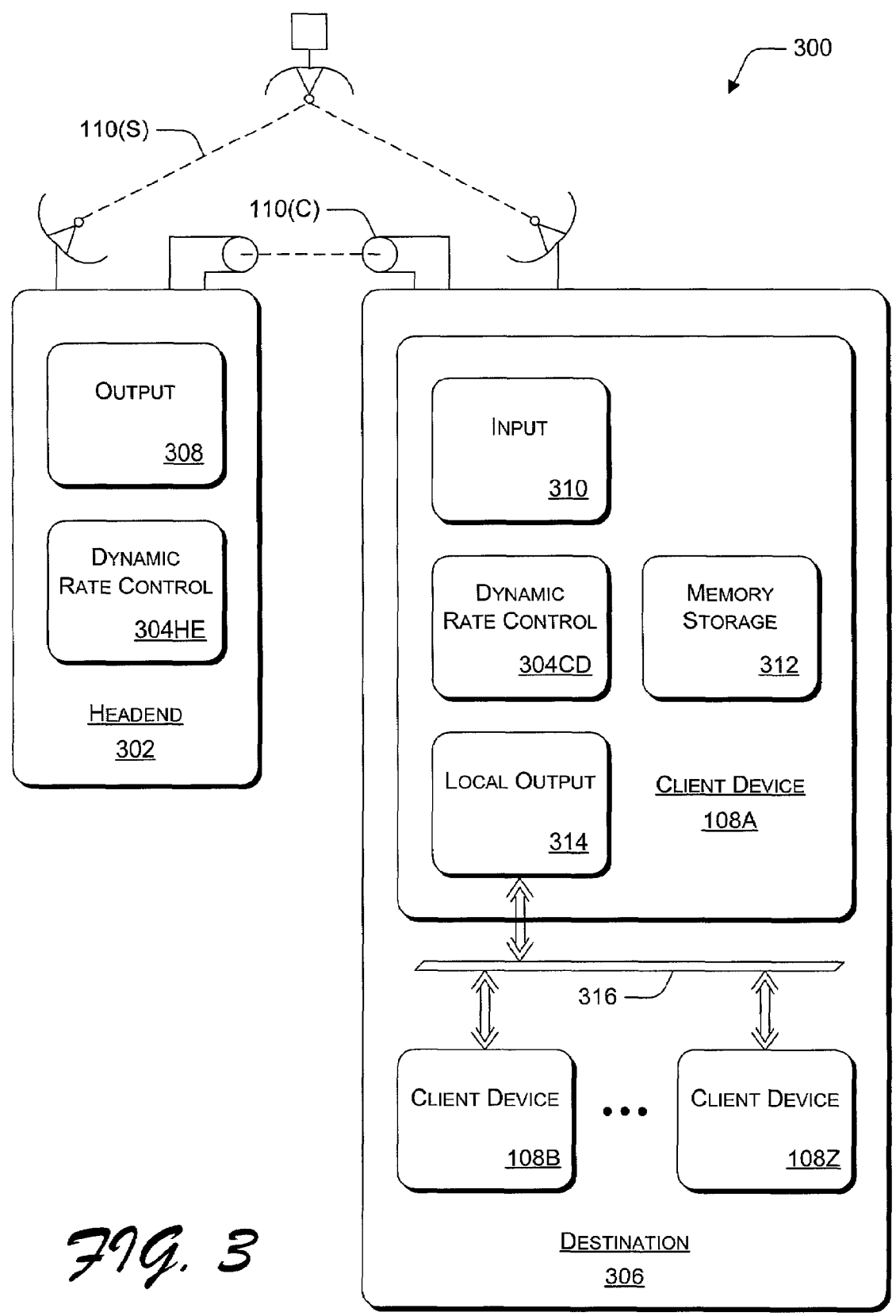
FIG. 3 illustrates exemplary apparatuses for a television-based entertainment system in which dynamic rate control units may be implemented.

FIG. 3 illustrates exemplary apparatuses 302 and 108 for a television-based entertainment system 300 in which dynamic rate control units 304 may be implemented. A headend 302 is in communication with a destination 306. Headend 302 may correspond to one or more of content provider 102 (of FIG. 1), other information provider 104, content distribution system 106, streamed information from other networks provider 142, and so forth. Destination 306 may correspond to a home, business, or other location that includes at least one client device 108. Headend 302 sends content information, streamed information, and other information towards client device 108A over network 110. Client device 108A receives the content information, streamed information, and other information via network 110.

Each of headend 302 and client device 108A includes one or more dynamic rate control units 304. Dynamic rate control units 304 may be formed from general processor(s) and memory component(s) of the respective headend 302 and client device 108A. Alternatively, specific processor(s) and/or memory component(s) may be used to implement dynamic rate control units 304. For example, an application specific integrated circuit (ASIC) may be created and utilized as dynamic rate control units 304. In any event, dynamic rate control units 304 may operate to dynamically control the bit rate of data streams that are being forwarded in real-time.

At headend 302, dynamic rate control unit 304HE performs real-time rate control prior to and simultaneously with the forwarding of a coded (e.g., encoded, transcoded, compressed, etc.) data stream to an output component 308. In this case, dynamic rate control unit 304HE is effectively (en)coding real-time information into a data stream. Output component 308 may correspond to transceiver 128 (of FIG. 1), a transmitter, or any general output device suitable for interoperability with network 110. The data stream is forwarded over network 110 from output component 308. In the implementation of FIG. 3, a cable transmission medium 110(C) and a satellite transmission medium 110(S) are shown. Other transmission mediums may alternatively be used to realize network 110 as is described above with reference to FIG. 1. The data stream is forwarded from output component 308 over cable transmission medium 110(C) and/or satellite transmission medium 110(S).

The data stream is received at destination 306 using an input component 310 of client device 108A via cable transmission medium 110(C) and/or satellite transmission medium 110(S). Input component 310 may correspond to any device suitable for interoperability with network 110 such as a cable/satellite network interface, a TCP/IP network interface, a general receiver or transceiver, and so forth. Input component 310 may provide the encoded data stream to one or more decoders (not shown) and/or one or more tuners for subsequent processing, display, and/or storage. Input component 310 may also provide the encoded data stream to dynamic rate control unit 304CD.

Dynamic rate control unit 304CD receives a decoded data stream from a decoder (not shown) or an encoded data stream directly from input component 310. When dynamic rate control unit 304CD receives an encoded data stream, dynamic rate control unit 304CD is effectively transcoding the encoded data stream into another, transcoded data stream that is compressed further and therefore consumes still fewer bits. Dynamic rate control unit 304CD may forward the transcoded data stream to memory storage 312 and/or to local output component 314. Memory storage 312 is capable of storing the data stream. Memory storage 312 may be implemented with one or more memory components, examples of which include a random access memory (RAM), a disk drive, another mass storage component, a non-volatile solid-state memory (e.g., ROM, Flash, EPROM, EEPROM, etc.), and so forth. It should be understood that dynamic rate control unit 304CD may alternatively forward an encoded data stream to memory storage 312 and/or to local output component 314 when dynamic rate control unit 304CD is operating on non-encoded/decoded data.

Local output component 314 is capable of transmitting the transcoded (or encoded) data stream over a local network 316 that extends over all or part of destination 306. Local output component 314 and local network 316 may operate in accordance with any wired or wireless network protocol, examples of which include a local area network (LAN), a TCP/IP based network, a Bluetooth® network, an IEEE 802.11b-based network, and so forth. The transcoded (or encoded) data stream is received via local network 316 at one or more client devices 108B, . . . 108Z. Client devices 108B, . . . 108Z each include a local input component (not shown) for interfacing with local network 316 and one or more decoders for decoding the transcoded (or encoded) data stream. Client devices 108B, . . . 108Z may also each include a dynamic rate control unit 304CD for forwarding a data stream to a memory storage located thereat or to another client device. Client devices 108B, . . . 108Z are capable of providing the original, non-coded information flow to an associated television 136 or 138 for presentation thereon.

Exemplary Dynamic Rate Control Implementations

An exemplary dynamic rate control algorithm is described using the ten terms (numbered (1)-(10)) in Table 1 below. The numbers in brackets in Table 1 correspond to element reference numbers from FIG. 4, which is directed to a flow diagram of the exemplary algorithm and is described below. (1) A "data_chunk" is a logical subset of data. In an MPEG-based implementation, a data_chunk may be macroblock, a slice, a picture, a group of pictures (GOP), and so forth. (2) A "time_window" is a set of contiguous data chunks that extend for a duration of a time_slot. (3) A "time_slot" is the time length of a time_window. For example, a time_slot may be equivalent to 30 pictures. (4) A "current_time" is a point in time of a time_slot and corresponds to a particular data_chunk. (5) A "target_bitcount" is the total expected bitcount accumulation over a time_window. For example, a target_bitcount of 4,000,000 bits for a time_slot of 30 pictures results in a 4 Mb/s data stream, assuming 30 pictures are presented each second. (6) A "current_bitcount" is a number of bits accumulated at and by a particular point during a time_window.

(7) A "window_level_control_parameter" (WLCP) is used to control the number of bits consumed by a data_chunk. In other words, the WLCP is a bit rate control parameter that affects the resulting bit rate of an information flow that is coded into a compressed data stream. The WLCP may be a scalar, a vector, a matrix parameter, and so forth. In an MPEG2-based implementation, for example, the WLCP may comprise the "quant matrix", the "quant_scale", or both. (8) A "window_level_modifier" (WLM) is a parameter that is used to modify the WLCP on a per-data_chunk basis. (9) "Multiple overlapping time_windows" (MOTWs) are multiple time_windows that overlap such that each instant in time and each data_chunk is included in more than one time_window. Each time_window of the MOTWs includes its own target_bitcount, current_bitcount, WLM, WLCP, and mechanism(s) for adjusting the WLCP. (10) A "top_level_control_parameter" (TLCP) is a parameter that can control the bit rate. The TLCP results at least from combining the contributions of multiple WLCPs (from corresponding MOTWs) that are associated with the current time instant.

TABLE 1

Terms used in exemplary dynamic rate control algorithm.

Figure 4:
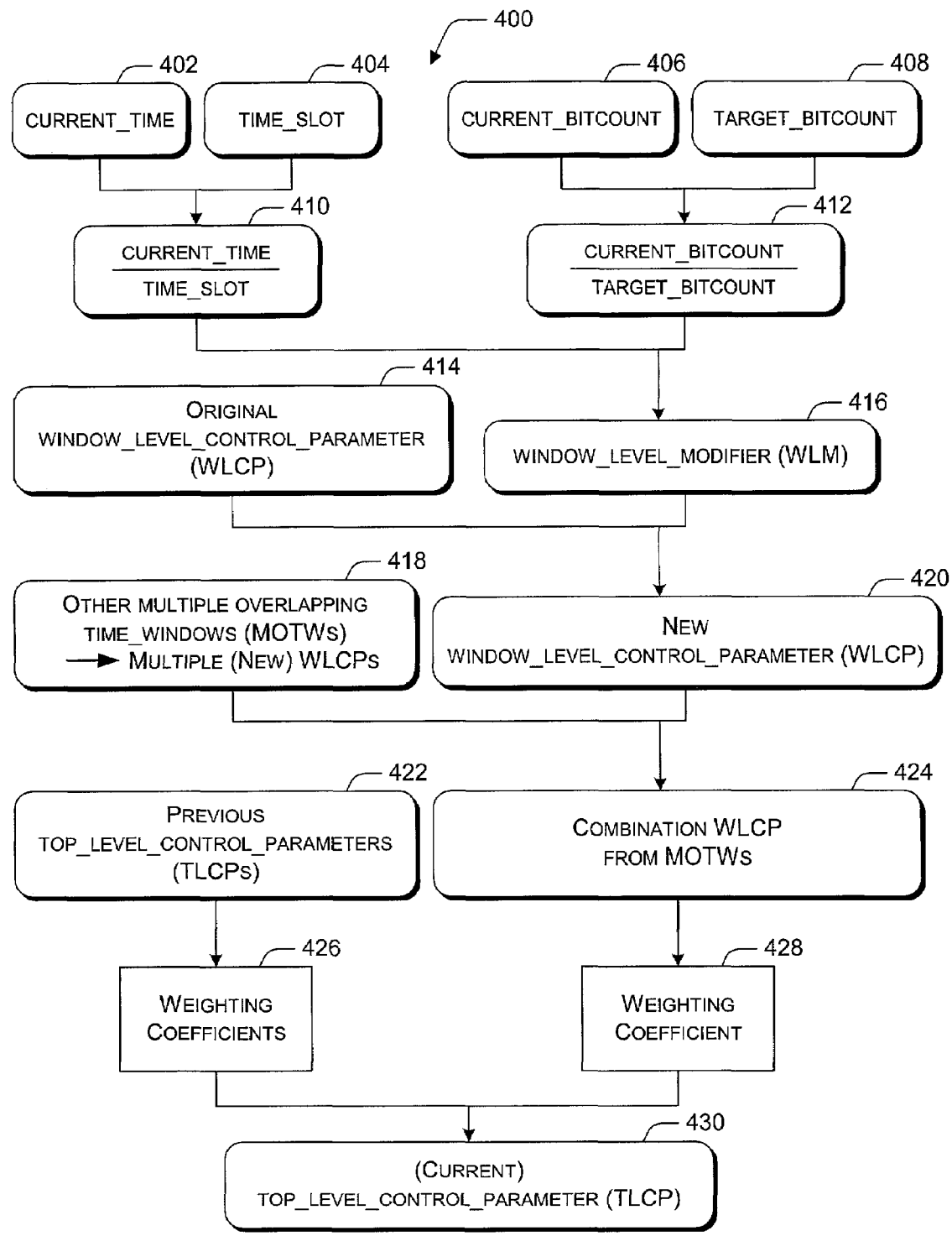
FIG. 4 is a flow diagram that illustrates an exemplary dynamic rate control algorithm.

| TERM [FIG. 4 Element No.] | ALGORITHMIC INTERPRETATION |
|---|---|
| (1) data_chunk | (1) logical subset of data |
| (2) time_window | (2) set of contiguous data_chunks that extend for a duration of a time_slot |
| (3) time_slot [404] | (3) length of time for a time_window |
| (4) current_time [402] | (4) point in time during a time_slot |
| (5) target_bitcount [408] | (5) total bitcount accumulation expected over a time_window |
| (6) current_bitcount [406] | (6) number of bits accumulated at a point in time during a time_window |
| (7) window_level_control_parameter (WLCP) [420] | (7) controls the number of bits consumed by a data_chunk |
| (8) window_level_modifer (WLM) [416] | (8) parameter to modify the WLCP on a per-chunk basis |

TABLE 1-continued

Terms used in exemplary dynamic rate control algorithm.

| TERM [FIG. 4 Element No.] | ALGORITHMIC INTERPRETATION |
| --- | --- |
| (9) multiple overlapping time_windows (MOTWs) [418] | (9) multiple time_windows that overlap such that each instant in time and each data_chunk is included in more than one time_window |
| (10) top level_control_parameter (TLCP) [430] | (10) parameter for controlling bit rate that results at least from combining the contributions of multiple WLCPs from corresponding MOTWs |

FIG. 4 is a flow diagram 400 that illustrates an exemplary dynamic rate control algorithm. Both qualitative and quantitative perspectives on flow diagram 400 are presented herein. A qualitative overview of the exemplary dynamic rate control algorithm is provided next. A current_time 402, a time_slot 404, a current_bitcount 406, and a target_bitcount 408 are determined in accordance with a data stream and time_window as shown in FIG. 2. Current_time 402 and time_slot 404 are used to produce a time-related ratio 410. Current_bitcount 406 and target_bitcount 408 are used to produce a bitcount-related ratio 412. Time-related ratio 410 and bitcount-related ratio 412 are used to generate WLM 416. Generating a WLM 416 is described further below with reference to FIGS. 5A, 5B, and 5C. An original WLCP 414 (e.g., an immediately previous WLCP) and WLM 416 are used to determine a new WLCP 420.

New WLCP 420 is determined with respect to an individual (but overlapping) time window. However, (other) multiple overlapping time windows (MOTWS) are used to produce multiple (new) WLCPs 418 for each given instant of time. While the absolute overall time instant and data stream point are the same, each time_window of all of the MOTWs has its own relative current_time 402 and current_bitcount 406. Multiple (new) WLCPs 418 and new WLCP 420 are combined into a combination WLCP 424 to represent all of the time_windows of the MOTWs. An exemplary set of MOTWs are described further below with reference to FIG. 6. One or more previous TLCPs 422 and combination WLCP 424, along with weighting coefficients 426 and a weighting coefficient 428, are used to calculate a current TLCP 430. Exemplary calculation methodologies are also presented below. Current TLCP 430 is used to set or adjust the bit rate of the data stream that results from an information flow being encoded, transcoded, or compressed.

A more quantitative view and a detailed description of the exemplary dynamic rate control algorithm is provided next. With reference now to FIGS. 2 and 4, the time_window of the graph 200 defines the temporal length of the window as time_slot 404 and the total expected accumulation of bits as target_bitcount 408. Each point along data stream 202, such as particular point 206, is associated with a current_time 402 and a current_bitcount 406. The ratio of current_time 402 to time_slot 404 forms time-related ratio 410. The ratio of current_bitcount 406 to target_bitcount 408 forms bitcount-related ratio 412. One or both of ratios 410 and 412 are used to generate WLM 416.

WLM 416 may be generated using any of many possible mechanisms. As alluded to above, U.S. Nonprovisional patent application Ser. No. 09/880,243, entitled "Non-Compensated Transcoding of a Video Stream", outlines one mechanism for generating WLM 416. The following second and third mechanisms are additional alternatives. These two mechanisms are described algebraically as:

$$WLM=1/[(1-\text{current\_time}/\text{time\_slot})*(1-\text{current\_bit-count}/\text{target\_bitcount})]\hat{\ }p; \text{ and} \quad [1]$$

$$WLM=1/[(1-\text{current\_time}/\text{time\_slot})+(1-\text{current\_bit-count}/\text{target\_bitcount})]\hat{\ }p, \quad [2]$$

where "p" is a user selectable parameter.

If the user desires that the rate control algorithm respond relatively rapidly to changes in the input, a large value of "p" (e.g., p>1) may be chosen. For a more damped response, relatively small values of "p" (e.g., p<=1) may be chosen.

In general under these two second and third mechanisms, WLM 416 increases as current_bitcount 406 approaches target_bitcount 408. And for the same ratio 412 of current_bitcount/target_bitcount, WLM 416 becomes larger as current_time 402 approaches the end of the time_window (i.e., time=time_slot 404). Exemplary fourth and fifth mechanisms are described below with reference to FIG. 5A and FIGS. 5B-C, respectively.

Figure 5A:
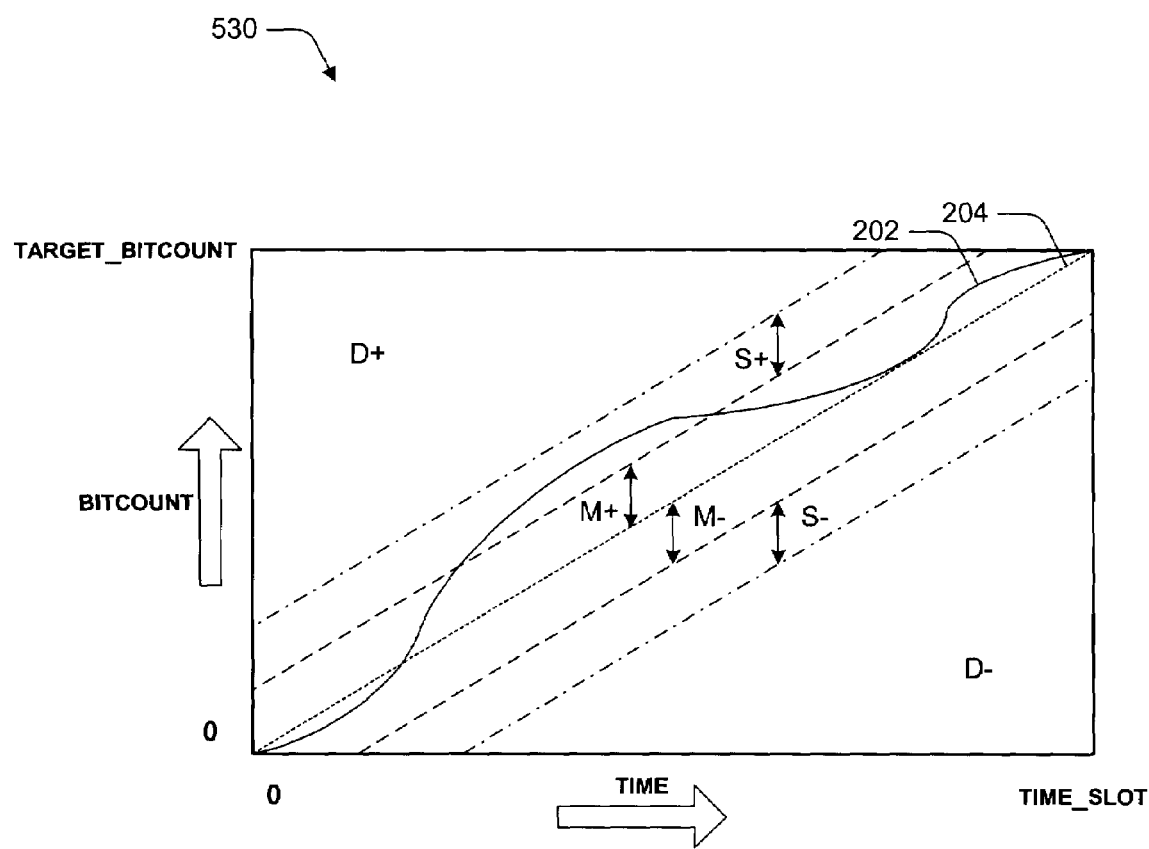
FIG. 5A is a graph that illustrates an exemplary approach for generating a window_level_modifier.

FIG. 5A is a graph 530 that illustrates a fourth exemplary mechanism for generating a WLM 416. This fourth mechanism is a zone-based mechanism in which the magnitude and positive/negative value of the WLM is determined responsive to the zone in which data stream 202 is located at the particular point in question. The graph 530 includes six zones: D−, S−, M−, M+, S+, and D+. The lettered zones correspond to a dramatic (D) change, a significant (S) change, and a minor (M) change. The positive/negative denotation indicates whether the WLM is positive or negative. For example, if a particular point along data stream 202 is located in the S− zone, then the WLM for that particular point in the time_window under consideration corresponds to the numeric value assigned to the S− zone. The numeric values assigned to the six zones may be determined empirically. As indicated by the dramatic (D), significant (S), and minor (M) designations, the absolute numeric values increase from the minor (M) zone to the significant (S) zone and from the significant (S) zone to the dramatic (D) zone. In alternative implementations, more or fewer than six zones may be utilized.

The positively-denoted zones above dashed line 204 represent that the WLM is positive; hence, the WLM will increase the WLCP (in this implementation as described further below). The negatively-denoted zones below the dashed line 204 represent that the WLM is negative; hence, the WLM will decrease the WLCP. Thus, when a particular point of data stream 202 is located in the M+ zone, the WLCP is increased by an amount M or an amount proportional to M. The increased WLCP, if applied directly to the quantization of the information flow that produces data stream 202, results in a coarser quantization (e.g., a coarser encoding or transcoding). The coarser quantization causes a reduced bit rate consumption that "drives" data stream 202 back towards dashed line 204. As is explained further below, an increased WLCP decreases the bit rate consumption when information is being compressed according to an MPEG standard for example. However, other standards may be employed in which an increased WLCP increases bit rate consumption. In such instances, the positive/negative denotations (and corresponding values) of the zones of graph 530 are swapped.

Figure 5B:
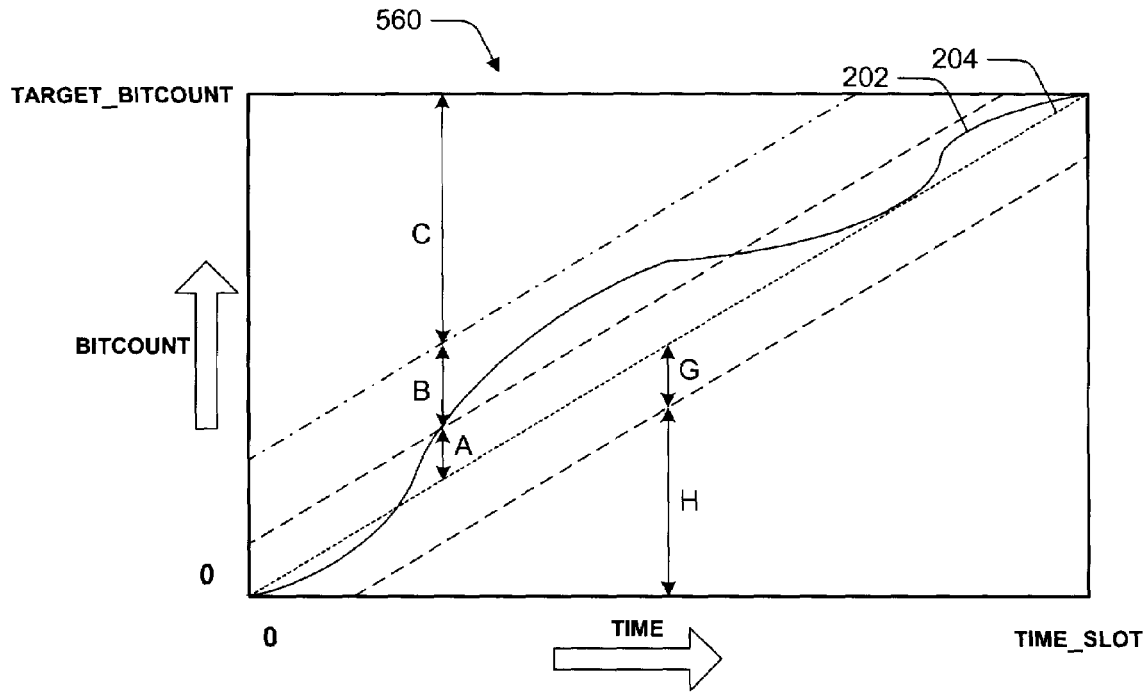
FIGS. 5B and 5C are graphs that illustrate another exemplary approach for generating a window_level_modifier.
Figure 5C:
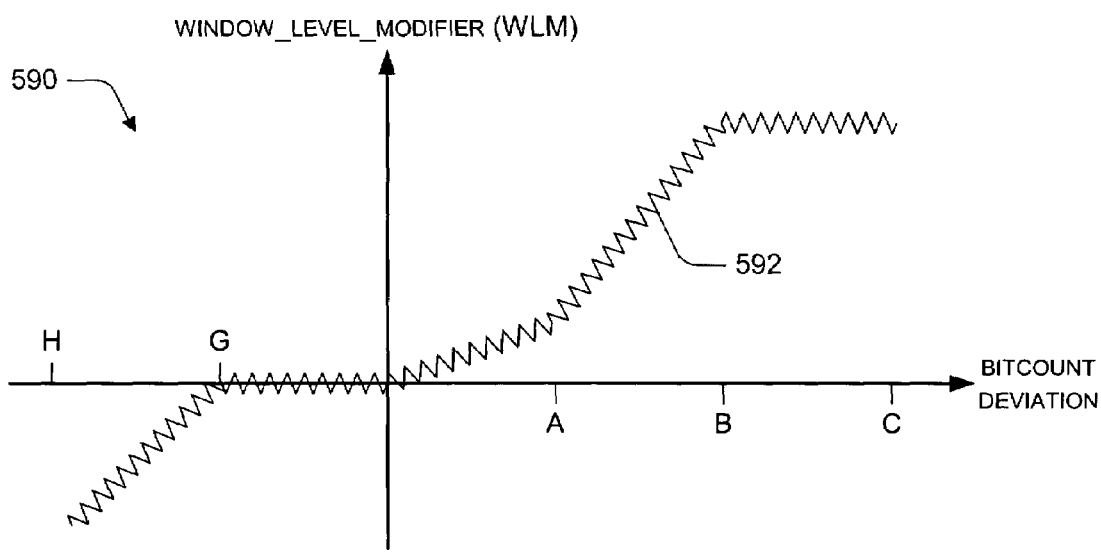

FIGS. 5B and 5C are graphs 560 and 590 that illustrate a fifth exemplary mechanism for generating a WLM 416. This fifth mechanism is a function-based mechanism. The bitcount deviation of data stream 202 from dashed line 204 is mapped to a WLM value. The function may be arithmetic, geometric, exponential, and so forth. For example, the function may square the bitcount deviation to map to a WLM so that the greater the bitcount deviation of data stream 202 from dashed line 204, the greater the WLM and the faster the data stream 202 may be re-directed to the expected bitcount accumulation as represented by dashed line 204. A specific exemplary function is shown in FIGS. 5B and 5C.

The graph 560 indicates five continuous zones A, B, C, G, and H. In contrast to the discrete zones of the fourth exemplary mechanism as illustrated in the graph 530 (of FIG. 5A), the five zones of the graph 560 map to continuously variable values of WLM. Graph 590 plots bitcount deviation along the abscissa axis versus WLM values along the ordinate axis. The five continuous zones A, B, C, G, and H from graph 560 are also noted along the bitcount deviation axis. A function 592 maps the bitcount deviation of data stream 202 to the WLM values. This function 592 may be implemented computationally, as a tabular data structure in a memory, and so forth.

When the bitcount deviation is slightly negative (e.g., when data stream 202 is located below dashed line 204, as in zone G), the WLM is zero so that the WLCP is unchanged. When the bitcount deviation is more negative (e.g., located in zone H), the WLM is negative and increases in the negative direction at a predetermined rate. When the bitcount deviation is slightly positive (e.g., located in zone A), the WLM is positive and increases at a first predetermined rate. As the bitcount deviation becomes more positive (e.g., located in zone B), the WLM becomes more positive and increases at a second, higher predetermined rate. Eventually, so as to prevent the WLM from becoming too large and the WLCP from changing to quickly, the WLM value becomes saturated even as the bitcount deviation increases (e.g., when the bitcount deviation is located in zone C). Any one or more of these five exemplary mechanisms may be used in order to generate a WLM 416.

Continuing again wither reference to flow diagram 400 of FIG. 4, a new WLCP 420 is determined by using WLM 416 and an original (e.g., an immediately previous) WLCP 414. In an exemplary MPEG implementation, the WLCP may correspond to the quant_scale, the quant_matrix, or both. The WLCP determination mechanisms described below may be used for either quantization parameter or both. The quant_scale is a parameter within an MPEG stream that enables the changing of the quantization scale of each macroblock. The quant_matrix is a matrix parameter in an MPEG stream that is constant for all macroblocks for the duration of a picture. Each element of this matrix can be changed using any of the exemplary WLCP determination functions f1 defined below.

Given a WLM on a per-chunk basis, the new_quant_scale for each macroblock is determined as a function (f1) of this WLM together with the original_quant_scale of the macroblock. Other MPEG parameters may be involved in the function as well. In general, new_quant_scale=f1 (WLM, original_quant_scale, optionally other_parameters).

Five (5) exemplary functions (f1) for determining a WLCP 420 in an MPEG-based implementation are presented below:

$$f1 = \text{original\_quant\_scale} + WLM; \quad (1)$$

$$f1 = \text{original\_quant\_scale} * WLM; \quad (2)$$

$$f1 = m\text{btype} == \text{INTRA? original\_quant\_scale:original\_quant\_scale} + WLM; \quad (3)$$

$$f1 = \text{frametype} == I\_\text{TYPE? original\_quant\_scale:original\_quant\_scale} + WLM; \text{ and} \quad (4)$$

$$f1 = \text{original\_quant\_scale} + WLM*(2*\text{gopsize} - \text{current\_position\_in\_}gop)/(2*\text{gopsize}). \quad (5)$$

Function (3) depends on the type of MPEG macroblock. Function (4) depends on the type of MPEG frame. Function (5) depends on the size of the group of pictures (GOP) and the current position in the GOP.

Determining new WLCP 420 therefore involves original WLCP 414 and WLM 416. When using an MPEG-based compression/coding approach, new WLCP 420 may correspond to new_quant_scale (in the f1 functions above) and original WLCP 414 may correspond to original_quant_scale. For other compression/coding standards and schemes, the applicable bit rate control parameter or parameters thereof may be substituted for the quant_scale/quant_matrix parameters of MPEG. The applicable bit rate control parameter(s) of other standards and schemes may therefore correspond to the WLCP of the algorithm of flow diagram 400 (of FIG. 4).

The algorithmic aspects 402-420 generally apply to a single time_window, such as the one that is illustrated in FIG. 2. A particular point 206 corresponds to a current_time 402 and a current_bitcount 406. WLM 416 is generated from this particular point along data stream 202. Applying WLM 416 to original WLCP 414 determines a new WLCP 420. This new WLCP 420 serves to govern the bit rate of data stream 202 relative to an expected bitcount accumulation (e.g., as indicated by the dashed line 204) and a total expected bitcount accumulation as designated by target bitcount 408 at time_slot 404. The WLCP 420 thus governs, or limits, the bitcount accumulation of data stream 202 in terms of a single time_window. This can cause the bit-rate-limiting feature of such an algorithm to, for example, reduce presentation quality within a first time_window unnecessarily because the bit rate in a succeeding time_window will be lower in any event due to information therein that is more easily compressed. Furthermore, modifying data stream 202 from the perspective of a single, artificially imposed time_window can create a beating effect in the information as presented aurally, visually, etc. after decoding/decompression.

This beating effect is a human-perceptible change in presentation quality between data that was compressed at a first factor in a first time_window and immediately succeeding data that was compressed at a second factor in a second, immediately succeeding time_window. This compression factor differential, and the resulting beating effects, arise because of higher quantization towards the end of time_windows followed by lower quantization at the beginning of time_windows. To mitigate this beating effect, multiple overlapping time_windows are employed.

Figure 6:
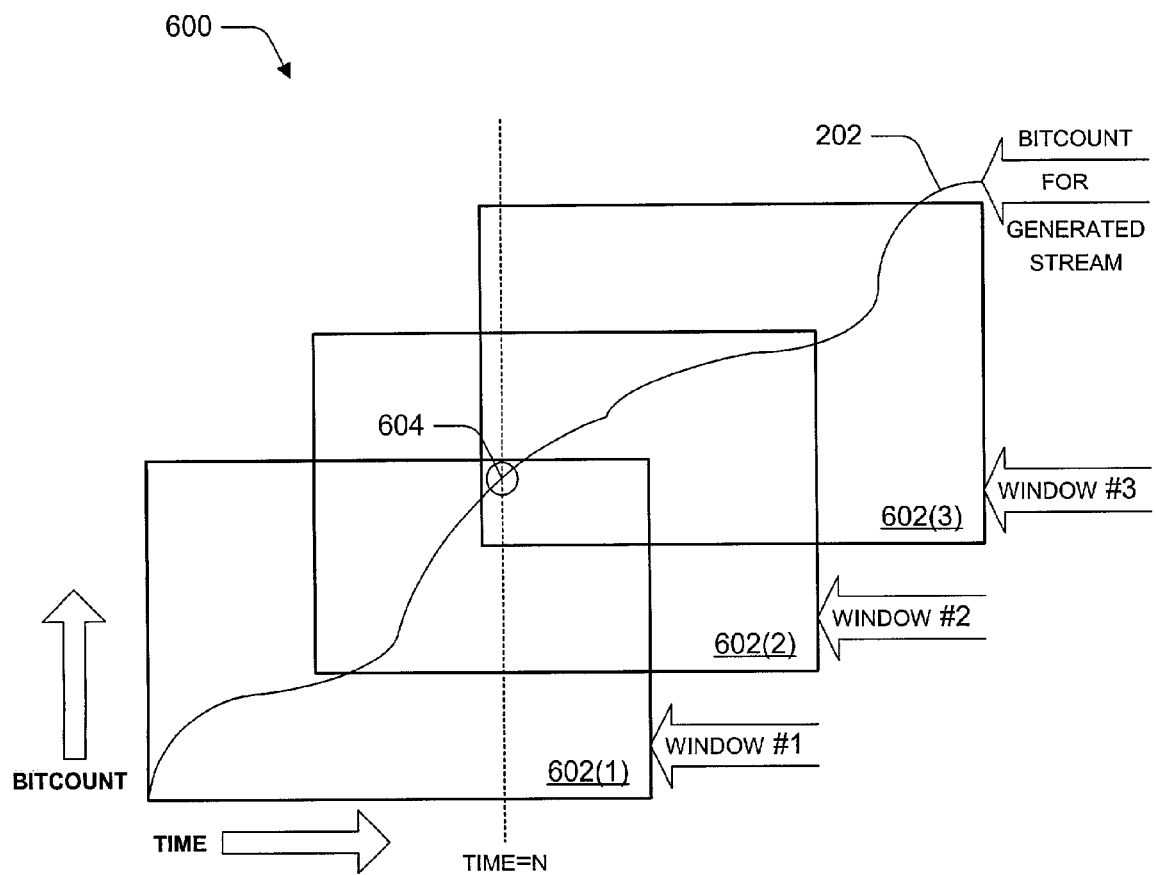
FIG. 6 illustrates an exemplary set of multiple overlapping time_windows in order to determine multiple window_level_control_parameters.

FIG. 6 illustrates an exemplary set 600 of multiple overlapping time_windows (MOTWs) in order to determine multiple window_level_control_parameters (WLCPs). In the MOTW set 600, bitcount is illustrated as increasing in the upward direction, and time is illustrated as elapsing in the rightward direction. The MOTW set 600 includes three time_windows 602(1), 602(2), and 602(3). Although only three time_windows 602 are shown as overlapping any given instant of time and/or position along data stream 202 in the MOTW set 600, two, four, five, or more time_windows may alternatively be used. Also, although each time_window 602 of "n" time_windows in the MOTW set 600 is shown as overlapping the immediately previous time_window 602 by "(n−1)/n" of a time_window width, other overlapping distributions may alternatively be used.

Data stream 202 is illustrated as crossing through all three illustrated time_windows 602 as it reaches an intermediate or a final bitcount for the data stream as generated by the compression/coding standard that is being applied to the information flow that is to be forwarded. Each particular point along data stream 202, such as particular point 604 at time=N, is simultaneously located in three overlapping time_windows 602. Each time_window 602 is used to independently generate a WLM 416, and each of these WLMs 416 is used to generate a (new) WLCP 420 from a respective (original) WLCP 414. New WLCPs 420 from each time_window of the MOTW set 600 are then combined.

Because the multiple time_windows 602 are overlapping, for any given time instant, the relative "current_time=N" is different in each respective time_window 602. The current_bitcount, also being relative for each time_window 602, is likewise different in each respective time_window 602, even for the same particular point 604 along data stream 202. Although the target_bitcount and the time_slot values may differ between and among time_windows 602, they are at least approximately equal in the MOTW set 600 implementation as illustrated in FIG. 6.

The use of MOTW sets provides the ability to view the same particular data point of data stream 202 at different phases, thus mitigating the beating effect. More specifically, because the same bitcount is viewed through MOTWs, each instant of absolute time falls in different relative time locations and positions of the different overlapping time_windows. This mitigates the problem of drastic presentation quality reduction at the end of a time_window because (at any instant of absolute time) there will be other time_windows that will be operating at the beginning, near the beginning, at the middle, etc. of their time slots.

Continuing now with reference to FIG. 4, new WLCP 420 is therefore determined from one time_window of a MOTW set. Similarly, multiple new WLCPs 418 are determined from the other time_windows of the MOTW set. To produce combination WLCP 424 from the MOTW set, new WLCP 420 is combined with each WLCP of multiple new WLCPs 418. The WLCP 420 and the multiple WLCPs 418 (jointly termed the "contributing WLCPs") may be combined using any of many possible approaches. For example, the contributing WLCPs may be averaged to combine them into combination WLCP 424. The average may comprise the mean of the contributing WLCPs, the median of the contributing WLCPs, and so forth. Each individual WLCP of the contributing WLCPs may also be individually weighted.

Combination WLCP 424 may be used as (current) top_level_control_parameter (TLCP) 430. Current TLCP 430 is used as the bit rate control parameter (e.g. to set a quantization level) for the compression/coding standard or approach that is being used. In an MPEG implementation, for example, current TLCP 430 corresponds to the quant_scale, the quant_matrix, or both. Using combination WLCP 424 as current TLCP 430 smoothes quantization levels from one time window to the next. However, the quantization level can still change too dramatically and/or be subject to spurious deviations in the information-flow-to-be forwarded such that changes in the presentation quality after decompression are perceivable to the human eye or ear. To avoid this, (previous) TLCPs 422 may be used to calculate current TLCP 430; this can minimize or reduce the likelihood that quantization levels change too quickly by incorporating a history of TLCPs.

In other words, the TLCP to be used in quantizing the information flow into data stream 202 may be modified by using previously calculated TLCPs. Current TLCP 430 may be calculated from combination WLCP 424, previous TLCPs 422, weighting coefficients 426, and weighting coefficient 428. This calculation may be accomplished, for example, via an autoregressive model such as:

$$TLCP(n) = \Sigma_{k=n-1, n-2, \ldots, n-m} a_n(k) TLCP(k) + a_n(n) C(n),$$

where "C(n)" is the result of combining the contributing WLCPs to produce combination WLCP 424 for the current time instant. The parameter "m" is set based on the desired memory length for the current TLCP 430 calculation. The historical memory length aspect of the current TLCP 430 calculation is increased as the value of "m" is increased. The parameter "$a_n(k)$" is represented in flow diagram 400 by weighting coefficients 426, and the parameter "$a_n(n)$" is represented by weighting coefficient 428. In an exemplary implementation, $a_n(k)$ is set equal to 0.9 for k=n−1, and zero for smaller values of k, and $a_n(n)$ is set equal to 0.1. In general, the greater the value of $a_n(k)$ relative to that of $a_n(n)$, the slower the quantization rate changes because there is greater emphasis placed on the historical (i.e., previous) TLCP values 422. An exemplary simplification of the term $a_n(k)$ is to have a dependence only on the difference between n and k, i.e. $a_n(k) = a(n-k)$.

The algorithm of flow diagram 400 (of FIG. 4) thus provides a mechanism for dynamically providing rate control for an information flow that is being compressed/coded into a data stream. The mechanism limits or governs the total bit accumulation of the resulting data stream while minimizing or reducing perceptible beating effects. Dynamic rate control units 304 (of FIG. 3) may implement, optionally in conjunction with other components of headend 302 and client device 108, the algorithm of flow diagram 400.

Exemplary Dynamic Rate Control Units

Figure 7A:
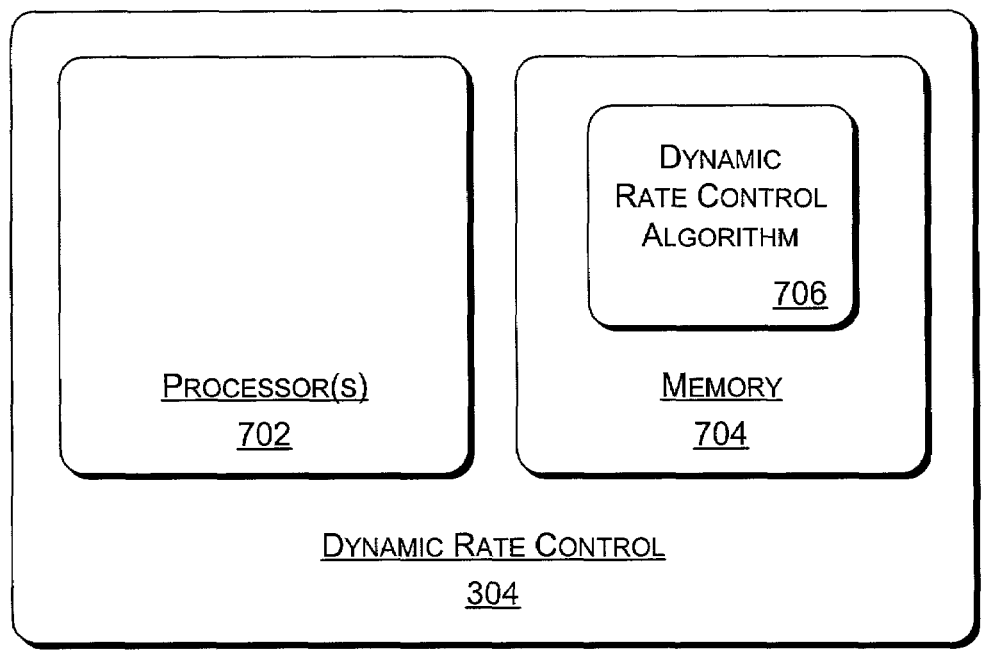
FIG. 7A illustrates an exemplary dynamic rate control unit from a component perspective.

FIG. 7A illustrates an exemplary dynamic rate control unit 304 from a component perspective. Dynamic rate control unit 304 includes one or more processors 702 and one or more memories 704. Processor 702 is capable of processing various instructions to control the operation of dynamic rate control unit 304 and to communicate with other components and/or other electronic/computing devices. Memory 704 can be implemented with one or more memory components, examples of which include a random access memory (RAM), a disk drive or other mass storage component, a non-volatile memory (e.g., ROM, Flash, EPROM, EEPROM, etc.), and so forth. While any single type of memory or combination of memory types is possible, memory 704 most likely includes at least (i) a RAM for processing and (ii) a mass storage or non-volatile memory for longer-term storage. Memory 704 is adapted to store various instructions and/or information such as operating system and/or configuration information, stream-able data, and so forth.

Specifically, memory 704 stores computer-executable instructions, relevant data structures, and/or any other information for implementing the algorithm of flow diagram 400 (of FIG. 4) as denoted by dynamic rate control algorithm 706. Dynamic rate control unit 304 may be realized in any of many possible manners. For example, processor 702 and memory 704 may be integrated together on one or more dedicated chips (e.g., one or more ASICs). Alternatively, processor 702 and memory 704 may be shared across one or more other tasks being performed by headend 302 or client device 108. In fact, dynamic rate control algorithm 706 may be stored in general purpose memory and executed on general purpose processor(s) (not shown separately) of headend 302 or client device 108 using, for example, a multi-tasking and memory sharing scheme.

It should be noted that client devices 108 can include a range of processing and memory capabilities, and may include more or fewer types of memory components than those enumerated above. For example, full-resource clients 108 can be implemented with substantial memory and processing resources, including a disk drive or similar mass storage medium. Low-resource clients, however, may have limited processing and memory capabilities, such as a limited amount of RAM, no disk drive, limited processing capabilities, and so forth. Furthermore, client devices 108 may include a decoder to decode a broadcast video signal, such as an NTSC, PAL, SECAM or other TV system video signal.

Figure 7B:
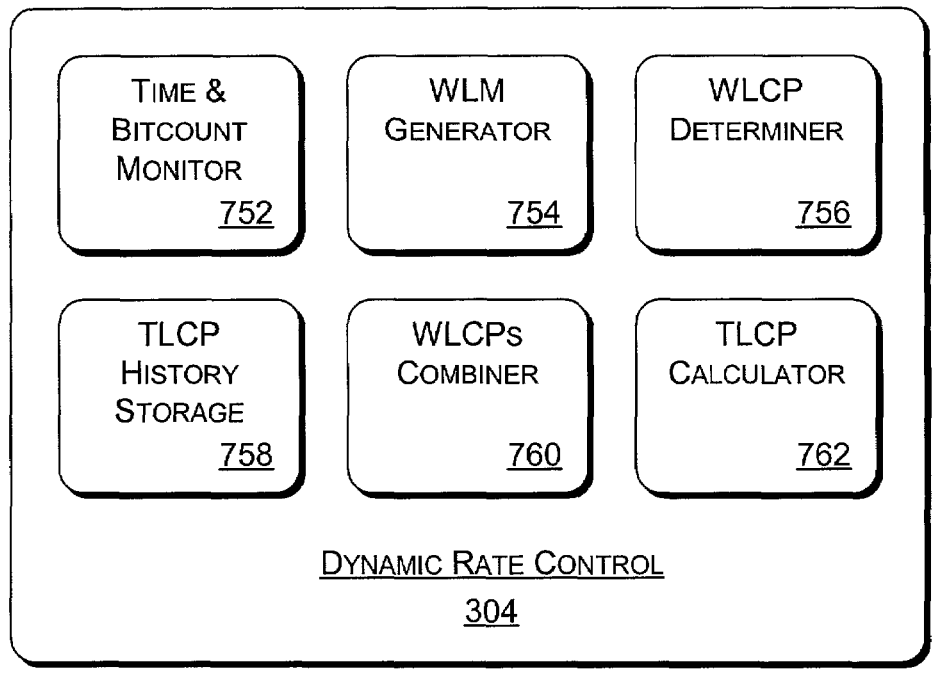
FIG. 7B illustrates an exemplary dynamic rate control unit from a functional perspective.

FIG. 7B illustrates an exemplary dynamic rate control unit 304 from a functional perspective. Dynamic rate control unit 304 includes six (6) functional blocks. Each functional block may be implemented as an IC or part thereof, as a logical module operable by processor(s) in conjunction with memory or memories, as one or more computer-executable instructions, and so forth. The latter two examples may be stored in a computer-accessible memory (e.g., as part of dynamic rate control algorithm 706 (of FIG. 7A)). The functional blocks 752-762 are described below with reference to specific aspects 402-430 of the algorithm of flow diagram 400 (of FIG. 4). However, it should be understood that the functions performed by blocks 752-762 may overlap across multiple aspects of flow diagram 400 or may only perform a portion of one or more of such aspects.

A time and bitcount monitor block 752 performs aspects 402 and 406 of flow diagram 400 by monitoring and being capable of providing current_time 402 and current_bitcount 406. Time and bitcount monitor block 752 may also perform aspects 404 and 408 by recording and being capable of providing time_slot 404 and target_bitcount 408. A WLM generator block 754 performs aspects 410, 412, and 416 of flow diagram 400 after receiving parameters from time and bitcount monitor block 752. WLM generator block 754 (along with the other functional blocks of FIG. 7B) may also implement any of the alternatives described above with reference to the various aspects of flow diagram 400. For example, WLM generator block 754 may generate WLM 416 based upon (i) the position in the time_window, (ii) the current_bitcount thereat, and (iii) the position in the GOP.

A WLCP determiner block 756 performs aspect 420 (new WLCP) in conjunction with aspect 414 (original WLCP), as is described above with reference to FIG. 4, using a WLM from WLM generator block 754. A TLCP history storage block 758 stores previous TLCPs (for aspect 422) in a memory of dynamic rate control 304, such as memory 704. The number of previous TLCPs stored in TLCP history storage block 758 corresponds to the parameter "m" as described above with respect to the autoregressive model implementation. A WLCPs combiner block 760 performs aspect 424 by, for example, receiving multiple WLCPs of multiple overlapping time_windows from WLCP determiner block 756 and averaging the multiple WLCPs. A TLCP calculator block 762, when present, performs aspects 426, 428, and 430 to calculate a current TLCP from previous TLCPs and a combination WLCP as received from TLCP history storage block 758 and WLCPs combiner block 760, respectively.

Methods for Dynamic Rate Control

Dynamic rate control may be described in the general context of computer-executable instructions. Generally, computer-executable instructions include routines, programs, objects, components, data structures, and the like that perform particular functions or implement particular abstract data types. Dynamic rate control may also be practiced in distributed computing environments where functions are performed by remote processing devices that are linked through a communications network. In a distributed computing environment, computer-executable instructions may be located in both local and remote computer storage media.

Figure 8:
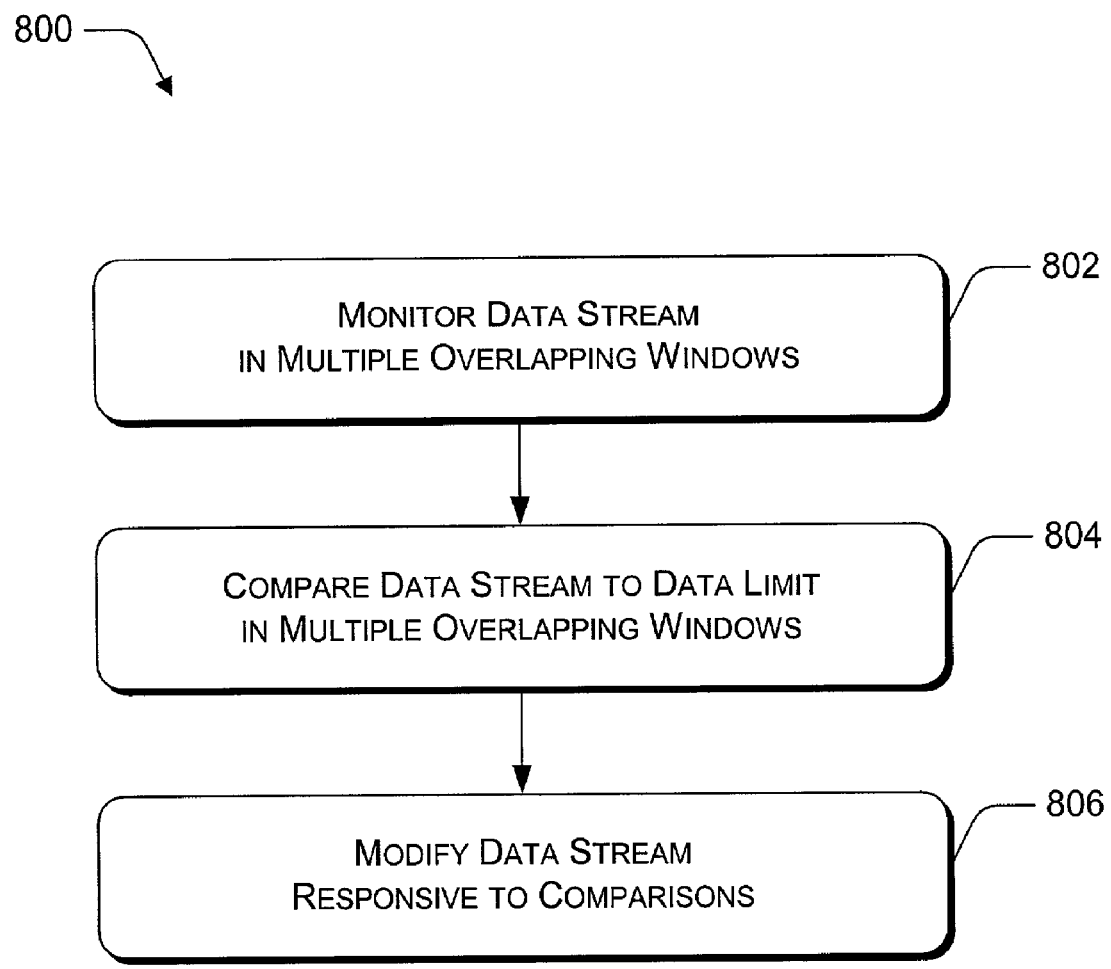
FIG. 8 is a flow diagram that illustrates an exemplary method for dynamically controlling a data stream.
Figure 9:
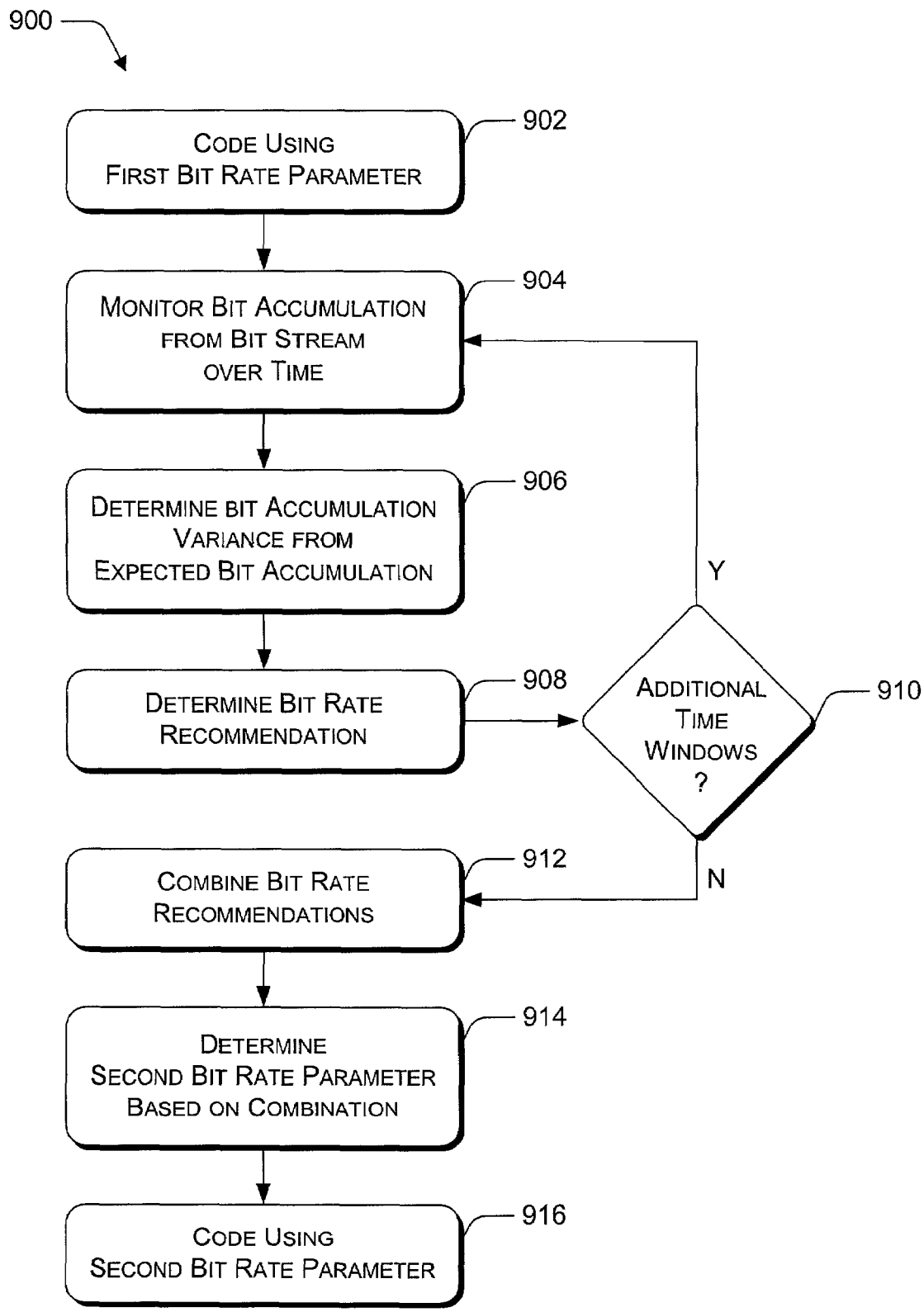
FIG. 9 is a flow diagram that illustrates an exemplary method for dynamically controlling a data rate.

The methods of FIGS. 8 and 9 are illustrated in flow diagrams divided into multiple method blocks. However, the order in which the methods are described is not intended to be construed as a limitation, and any number of the described method blocks can be combined in any order to implement one or more methods for dynamic rate control. Furthermore, although the methods are described below with reference to television entertainment environments 100 and 300 and the algorithm of flow diagram 400 where applicable, the methods can be implemented in any suitable hardware, software, firmware, or combination thereof and using suitable mathematical alternatives.

FIG. 8 is a flow diagram 800 that illustrates an exemplary method for dynamically controlling a data stream. Flow diagram 800 includes three method blocks 802, 804, and 806 that may be performed by dynamic rate control units 304. At block 802, a data stream is monitored in multiple overlapping windows. For example, a bit accumulation from the data stream in each of the multiple overlapping windows may be monitored to determine how fast the data stream is consuming bits. At block 804, the data stream is compared to a data limit in each window of the multiple overlapping windows. For example, at a given particular absolute point of the data stream that is located at varying relative positions in each window of the multiple overlapping windows, the bit accumulation at the particular point is compared to an expected bit accumulation at the corresponding relative position in each window of the multiple overlapping windows.

At block 806, the data stream is modified responsive to the comparisons. For example, if the bit accumulations in each window exceed the expected bit accumulations at the corresponding relative positions, then the data stream can be modified by reducing bit rate consumption. The bit rate consumption may be reduced by increasing the quantization coarseness of the compression/coding being applied to the underlying information flow. If, on the other hand, the bit accumulations in each window are below the expected bit accumulations at the corresponding relative positions, then the data stream can be modified by increasing bit rate consumption. Various compromises, interpolations, and/or averages may be employed when some bit accumulations are above and some bit s accumulations are below the expected bit accumulations at the corresponding relative positions in the multiple overlapping windows. Some examples of which are provided above with reference to flow diagram 400 (of FIG. 4). For instance, greater (or lesser) weight may be given to the modification recommendation originating from a window in which the given particular point is located at a relative position that is near the end of that window.

FIG. 9 is a flow diagram 900 that illustrates an exemplary method for dynamically controlling a data rate. Flow diagram 900 includes eight method blocks that illustrate a dynamic rate control where coding/compressing starts at a first bit rate and is changed to a second bit rate. The method of flow diagram 900 may be performed at dynamic rate control units 304. At block 902, an information flow is coded (e.g., encoded, transcoded, compressed, etc.) using a first bit rate parameter. Using an MPEG coding process, for example, the bit rate parameter may correspond to a quant_scale, a quant_matrix, or both. With respect to flow diagram 400, the bit rate parameter may correspond to a first (current) TLCP 430. At block 904, the bit accumulation of the bit stream that results from coding the information flow is monitored over time. In effect, the bit consumption of the bit stream is tracked at various times (as the flow diagram 900 is repeated during real-time use). These various times are notable as corresponding to the current bitcount accumulation.

The variance between the actual bit accumulation and an expected bit accumulation is determined at block 906. The expected bit accumulation is predetermined for each time window based on bandwidth limits. A bit rate change recommendation may be determined from the variance. This bit rate change recommendation may correspond to a WLM of aspect 416 of flow diagram 400. At block 908, a bit rate recommendation for the current time window is determined from the variance (e.g., using a respective bit rate change recommendation). This determination may ultimately correspond to aspect 420. At decision block 910, it is determined whether there are still additional time windows for consideration. If so, then flow diagram 900 continues at block 904 to repeat blocks 904-908 for another time window. If not, then flow diagram 900 continues with block 912. In other words, if all of the relevant overlapping time windows have been analyzed to secure a bit rate recommendation therefrom, then the method can proceed to combine them. It should be understood that all or part of the "repeating" of blocks 904-908 may be occurring substantially simultaneously.

At block 912, the bit rate recommendations are combined. The bit rate recommendations for multiple time windows as determined in repeated performances of block 908 are thus combined. This combination may correspond to aspect 424 of flow diagram 400. A second bit rate parameter is determined based on the combination at block 914. The second bit rate parameter may correspond to a second (current) TLCP 430. As such, the second bit rate parameter may be determined (i) directly from the combination of bit rate recommendations or (ii) using the first bit rate parameter (optionally along with other previous bit rate parameters) and the combination of bit rate recommendations in an autoregressive or other (e.g., mathematical) model. The latter option may correspond to aspects 422, 426, and 428 of algorithm 400. After the second bit rate parameter is determined, coding is effectuated using the second bit rate parameter at block 916. Flow diagram 900 may be repeated as the information flow/data stream is coded into the bit stream according to the current bit rate parameter. The bit stream may also be contemporaneously being forwarded from dynamic rate control unit 304 to output component 308, local output component 314, memory storage 312, and so forth.

CONCLUSION

Although systems and methods have been described in language specific to structural features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A method for providing real-time rate control, comprising:
    tracking a current bitcount in a time window of a plurality of time windows;
    noting a current time in the time window;
    generating a window level modifier based on the current time and the current bitcount in the time window;
    determining a new window level control parameter for the time window based on the window level modifier;
    repeating the actions of tracking, noting, generating, and determining for each other time window of the plurality of time windows to produce a plurality of new window level control parameters, wherein each time window of the plurality of time windows overlaps at least one other time window of the plurality of time windows;
    combining each new window level control parameters at a window level control parameter combiner, the window level control parameter combiner adapted to combine the new window level control parameter for each respective time window of the plurality of time windows to produce a combined window level control parameter, wherein the window level control parameter combiner is further adapted to combine the new window level control parameters for each respective time window of the plurality of time windows using an average of the new window level control parameters for each respective time window of the plurality of time windows; and
    calculating a top level control parameter based on the new window level control parameter and the plurality of new window level control parameters.

2. The method as recited in claim 1, wherein the action of tracking a current bitcount comprises accumulating bits from a data stream during the time window.

3. The method as recited in claim 1, wherein the action of noting a current time comprises noting a time that corresponds to the current bitcount in the time window.

4. The method as recited in claim 1, wherein the action of generating a window level modifier comprises:
    ascertaining a time-related ratio between the current time and a total time for a time slot that corresponds to the time window;
    ascertaining a bitcount-related ratio between the current bitcount and a target bitcount for a total expected bitcount accumulation that corresponds to the time window; and
    generating the window level modifier responsive to the time-related ratio and the bitcount-related ratio.

5. The method as recited in claim 1, wherein the action of generating a window level modifier comprises generating the window level modifier such that the window level modifier is greater the further the current bitcount is above an expected bitcount.

6. The method as recited in claim 1, wherein the action of generating a window level modifier comprises generating the window level modifier such that the window level modifier is greater the closer the current time is to a total time for a time slot that corresponds to the time window.

7. The method as recited in claim I, wherein the action of generating a window level modifier comprises generating the window level modifier such that the window level modifier is greater the closer the current bitcount is to a target bitcount of a total expected bitcount accumulation that corresponds to the time window.

8. The method as recited in claim 1, wherein the action of generating a window level modifier comprises generating the window level modifier using at least one of a zone-based mechanism or a function-based mechanism.

9. The method as recited in claim 1, wherein the action of determining a new window level control parameter comprises determining the new window level control parameter for the time window based on the window level modifier and an original window level control parameter.

10. The method as recited in claim 9, wherein the action of determining the new window level control parameter comprises adding the window level modifier to the original window level control parameter.

11. The method as recited in claim 9, wherein the action of determining the new window level control parameter comprises multiplying the window level modifier and the original window level control parameter.

12. The method as recited in claim 1, wherein the action of determining a new window level control parameter comprises determining the new window level control parameter responsive to a group of pictures (GOP)-related parameter.

13. The method as recited in claim 1, wherein the action of determining a new window level control parameter comprises determining the new window level control parameter responsive to at least one of a macroblock type or a frame type.

14. The method as recited in claim 1, wherein the new window level control parameter comprises at least one of a quantization scale or a quantization matrix.

15. The method as recited in claim 14, wherein the method is used in conjunction with a Moving Pictures Expert Group (MPEG)—compliant coding/compressing technique.

16. The method as recited in claim 1, wherein the plurality of time windows comprise "n" total time windows, and the actions of tracking, noting, generating, and determining are repeated "n-1" times in the action of repeating; and
wherein the plurality of time windows are arranged such that each subsequent time window overlaps a previous time window by an "(n-1)/n" portion of a time window length.

17. The method as recited in claim 1, wherein the action of calculating a top level control parameter comprises calculating the top level control parameter based on the new window level control parameter, the plurality of new window level control parameters, and a plurality of previous top level control parameters.

18. The method as recited in claim 1, wherein the action of calculating a top level control parameter comprises calculating the top level control parameter responsive to a combination of the new window level control parameter and the plurality of new window level control parameters.

19. The method as recited in claim 18, wherein the action of calculating a top level control parameter further comprises calculating the top level control parameter based on the combination and a plurality of previous top level control parameters.

20. The method as recited in claim 18, wherein the action of calculating a top level control parameter further comprises calculating the top level control parameter based on the combination, a plurality of previous top level control parameters, and at least one weighting coefficient for each of the combination and the plurality of previous top level control parameters.

21. The method as recited in claim 20, wherein the at least one weighting coefficient for each of the combination and the plurality of previous top level control parameters may be selected so as to control a speed at which a data stream bit rate is changed.

22. The method as recited in claim 1, further comprising:
forwarding a data stream as modified by the top level control parameter.

23. The method as recited in claim 22, wherein the action of forwarding a data stream comprises transmitting the data stream over a network.

24. The method as recited in claim 22, wherein the action of forwarding a data stream comprises writing the data stream to memory storage.

25. The method as recited in claim 1, wherein the method is performed by a headend of a television-based entertainment system.

26. The method as recited in claim 1, wherein the method is performed by a client device of a television-based entertainment system.

27. One or more electronically-accessible storage media comprising electronically-executable instructions that, when executed by at least one processor, direct an electronic apparatus to perform the method as recited in claim 1.

28. An apparatus, comprising:
a time and bitcount monitor, the time and bitcount monitor adapted to monitor a current time and a current bitcount in each time window of a plurality of time windows, each time window of the plurality of time windows overlapping each other time window of the plurality of time windows;
a window level modifier generator, the window level modifier generator receiving the current time and the current bitcount for each time window from the time and bitcount monitor, the window level modifier generator adapted to generate a window level modifier for each time window based on the current time and the current bitcount for each respective time window;
a window level control parameter determiner, the window level control parameter determiner receiving the window level modifier for each time window from the window level modifier generator, the window level control parameter determiner adapted to determine a new window level control parameter for each time window based on the window level modifier for each respective time window;
a window level control parameter combiner, the window level control parameter combiner receiving the new window level control parameter for each time window from the window level control parameter determiner, the window level control parameter combiner adapted to combine the new window level control parameter for each respective time window of the plurality of time windows to produce a combined window level control parameter;
a top level control parameter history storage, the top level control parameter history storage storing a plurality of previous top level control parameters;
a top level control parameter calculator1 the top level control parameter calculator receiving the plurality of previous top level control parameters from the top level control parameter history storage and the combined window level control parameter from the window level control parameter combiner, the top level control parameter calculator adapted to calculate a top level control parameter based on the combined window level control parameter and the plurality of previous top level control; and
wherein the window level control parameter combiner is further adapted to combine the new window level control parameters for each respective time window of the plurality of time windows using an average of the new window level control parameters for each respective time window of the plurality of time windows.

29. The apparatus as recited in claim 28, wherein the apparatus comprises a dynamic rate control unit.

30. The apparatus as recited in claim 28, wherein the apparatus comprises a headend of a television-based entertainment environment.

31. The apparatus as recited in claim 28, wherein the apparatus comprises a dent device of a television-based entertainment environment.

32. The apparatus as recited in claim 31, wherein the apparatus further comprises at least one of a local network output or a memory storage.

33. The apparatus as recited in claim 32, wherein the apparatus is adapted to forward a data stream that is modified by the top level control parameter to at least one of the local network output or the memory storage.

34. The apparatus as recited in claim 28, wherein the new window level control parameter comprises at least one of a quantization scale or a quantization matrix of a Moving Pictures Expert Group (MPEG)-compliant coding/compressing technique.

35. The apparatus as recited in claim 28, further comprising computer-accessible memory; wherein the time and bitcount monitor, the window level modifier generator, the window level control parameter determiner, the window level control parameter combiner, and the top level control parameter calculator are comprised at least partially of computer-executable instructions that are stored on the computer-accessible memory.

36. The apparatus as recited in claim 28, wherein the time and bitcount monitor, the window level modifier generator, the window level control parameter determiner, the window level control parameter combiner, and the top level control parameter calculator are comprised at least partially of at least one discrete integrated circuit.

37. The apparatus as recited in claim 28, wherein the time and bitcount monitor is adapted to monitor the current time and the current bitcount in each time window of the plurality of time windows in conjunction with monitoring an absolute time and a total bitcount accumulation that are associated with a data stream.

38. The apparatus as recited in claim 28, wherein the window level modifier generator is further adapted to generate the window level modifier for each time window relative to a time slot length and a target bitcount accumulation associated with each respective time window.

39. The apparatus as recited in claim 28, wherein the window level control parameter determiner is further adapted to determine the new window level control parameter based on at least one of a sum or a product determined responsive to the window level modifier and a previous window level control parameter for each respective time window.

40. An apparatus, comprising:
a time and bitcount monitor, the time and bitcount monitor adapted to monitor a current time and a current bitcount in each time window of a plurality of time windows, each time window of the plurality of time windows overlapping each other time window of the plurality of time windows;
a window level modifier generator, the window level modifier generator receiving the current time and the current bitcount for each time window from the time and bitcount monitor, the window level modifier generator adapted to generate a window level modifier for each time window based on the current time and the current bitcount for each respective time window;
a window level control parameter determiner, the window level control parameter determiner receiving the window level modifier for each time window from the window level modifier generator, the window level control parameter determiner adapted to determine a new window level control parameter for each time window based on the window level modifier for each respective time window;
a window level control parameter combiner, the window level control parameter combiner receiving the new window level control parameter for each time window from the window level control parameter determiner, the window level control parameter combiner adapted to combine the new window level control parameter for each respective time window of the plurality of time windows to produce a combined window level control parameter;
a top level control parameter history storage, the top level control parameter history storage storing a plurality of previous top level control parameters; and
a top level control parameter calculator, the top level control parameter calculator receiving the plurality of previous top level control parameters from the top level control parameter history storage and the combined window level control parameter from the window level control parameter combiner, the top level control parameter calculator adapted to calculate a top level control parameter based on the combined window level control parameter and the plurality of previous top level control parameters;
wherein the top level control parameter calculator is further adapted to calculate the top level control parameter responsive to an autoregressive model in which the combined window level control parameter is weighted versus the plurality of previous top level control parameters.

41. A client device for a television-based entertainment system, the client device comprising:
one or more processors; and
one or more memories in operative communication with the one or more processors, the one or more memories storing process or executable instructions that, when executed, cause the one or more processors to perform actions comprising:
monitoring a current bitcount of an associated data stream in each time window of a plurality of time windows, each time window of the plurality of time windows overlapping at least one other time window of the plurality of time windows;
generating a window level modifier for each time window based on the respective current bitcount for each time window and a respective current time for each time window that corresponds to the respective current bitcount;
determining a window level control parameter for each time window based on the respective window level modifier for each time window;
combining each window level control parameter for each time window of the plurality of time windows to produce a combined window level control parameter, wherein combining the new window level control parameters for each respective time window of the plurality of time windows uses an average of the determined window level control parameters for each respective time window of the plurality of time windows; and
modifying a quantization of the data stream based on the combined window level control parameter.

42. The client device as recited in claim 41, wherein the client device comprises a set-top box.

43. The client device as recited in claim 41, further comprising:
- a memory storage in operative communication with the one or more processors;
- wherein the processor-executable instructions that are stored by the one or more memories cause, when executed, the one or more processors to perform actions further comprising:
- forwarding the data stream to the memory storage for storage thereat.

44. The client device as recited in claim 41, further comprising:
- a local output component in operative communication with the one or more processors;
- wherein the processor-executable instructions that are stored by the one or more memories cause, when executed, the one or more processors to perform actions further comprising:
- forwarding the data stream to the local output component for outputting therefrom over a local network.

45. The client device as recited in claim 41, wherein the action of modifying a quantization of the data stream based on the combined window level control parameter comprises the action of modifying the quantization of the data stream based on the combined window level control parameter and at least one previous top level control parameter.

46. The client device as recited in claim 41, wherein the associated data stream of the monitoring action is already encoded and the data stream of the modifying action is transcoded.

47. The client device as recited in claim 41, wherein the associated data stream of the monitoring action is not encoded and the data stream of the modifying action is encoded.

48. A method for providing real-time rate control, comprising:
- tracking a current bitcount in a time window of a plurality of time windows;
- noting a current time in the time window;
- generating a window level modifier based on the current time and the current bitcount in the time window;
- determining a new window level control parameter for the time window based on the window level modifier;
- repeating the actions of tracking, noting, generating, and determining for each other time window of the plurality of time windows to produce a plurality of new window level control parameters;
- combining the plurality of new window level control parameters to produce a combined window level control parameter;
- calculating a top level control parameter based on the new window level control parameter and the plurality of new window level control parameters, wherein the top level control parameter is calculated responsive to an autoregressive model in which the combined window level control parameter is weighted versus a plurality of previous top level control parameters stored in a top level control parameter history storage;
- wherein each time window of the plurality of time windows overlaps at least one other time window of the plurality of time windows.

* * * * *